United States Patent
Sharp

(10) Patent No.: US 6,771,292 B2
(45) Date of Patent: Aug. 3, 2004

(54) METHOD AND SYSTEM FOR PROVIDING FEEDBACK CONCERNING A CONTENT PANE TO BE DOCKED IN A HOST WINDOW

(75) Inventor: Frederick Thomas Sharp, Menlo Park, CA (US)

(73) Assignee: International Business Machines Corporation, Armonk, NY (US)

(*) Notice: Subject to any disclaimer, the term of this patent is extended or adjusted under 35 U.S.C. 154(b) by 634 days.

(21) Appl. No.: 09/822,174

(22) Filed: Mar. 29, 2001

(65) Prior Publication Data

US 2002/0140737 A1 Oct. 3, 2002

(51) Int. Cl.[7] .................................................. G09G 5/00
(52) U.S. Cl. ........................ 345/788; 345/799; 345/798; 345/804
(58) Field of Search ................................. 345/781, 788, 345/792, 793, 798–800, 804, 805, 808

(56) References Cited

U.S. PATENT DOCUMENTS

| | | | |
|---|---|---|---|
| 5,714,971 A | | 2/1998 | Shalit et al. |
| 5,808,610 A | | 9/1998 | Benson et al. |
| 5,819,055 A | * | 10/1998 | MacLean et al. ........... 345/798 |
| 5,825,357 A | | 10/1998 | Malamud et al. |
| 5,864,330 A | | 1/1999 | Haynes |
| 5,870,091 A | * | 2/1999 | Lazarony et al. ........... 345/804 |
| 5,883,626 A | | 3/1999 | Glaser et al. |
| 5,917,483 A | | 6/1999 | Duncan et al. |
| 5,923,326 A | | 7/1999 | Bittinger et al. |
| 5,953,008 A | | 9/1999 | Hagiunda |
| 5,966,122 A | | 10/1999 | Itoh |
| 5,977,973 A | | 11/1999 | Sobeski et al. |
| 6,008,809 A | * | 12/1999 | Brooks ........................ 345/792 |
| 6,166,736 A | * | 12/2000 | Hugh .......................... 345/798 |
| 6,166,738 A | | 12/2000 | Robertson et al. |
| 6,188,405 B1 | | 2/2001 | Czerwinski et al. |

* cited by examiner

*Primary Examiner*—John Cabeca
*Assistant Examiner*—Brian Detwiler
(74) *Attorney, Agent, or Firm*—Sawyer Law Group LLP

(57) ABSTRACT

Providing feedback concerning a content pane to be docked in a host window is disclosed. The method and system comprises providing a description of a position of a content pane within a host window and utilizing a diagram to indicate the position and the orientation of the content pane within the host window. Docking is allowed to occur anywhere in the host window, not only in the border regions. In addition, docking positions include the positions inside the split panes. Given a vertical splitter bar, for example, the left-top, left-bottom, right-top, and right-bottom positions are available. The thumbnail feedback when docking shows how existing docking panes will be moved and resized, as well as the orientation and relative size of the resulting docking pane.

15 Claims, 13 Drawing Sheets

302

METHOD AND SYSTEM FOR PROVIDING FEEDBACK CONCERNING A CONTENT PANE TO BE DOCKED IN A HOST WINDOW

FIELD OF THE INVENTION

The present invention relates generally to docking and undocking of a content pane in a host window of a computer, and more particularly to providing feedback for docking the content pane.

BACKGROUND OF THE INVENTION

Computer systems which utilize a graphical user interface in a windows-like environment typically such a computer system will display a plurality of windows. Each of the windows can be moved via a pointing device. Typically each window has a separate existence on a graphical user interface desktop with its own title bar. To "dock" a window is to move its content pane into another window. The user moves the content pane using a dragging gesture of the mouse. When the content pane of a window is docked, it may rest in a "docking pane". So a content pane is undocked from windows, and docked or redocked into a docking pane. The window into which another window may be docked is called a "host window". To illustrate the docking and undocking feature, refer now to the following description in conjunction with the accompanying figures.

FIGS. 1 and 2 illustrate a conventional docking and undocking of a content pane 12 into a host window 10. In FIG. 1, docking and undocking feedback is provided by a dragged gray or black outline 14 through which the underlying components can be seen. This outline 14 shows size and orientation of a window whether docking or undocking. When undocking the window 12, the outline 14 is a thick granular gray border with the size and orientation of the resulting window. In FIG. 2, when docking, the outline 15 is a thin black border with the size and orientation (but not the precise position) of the resulting docking pane. A result of docking (not shown) is a border region separated from the center of the host window with a splitter bar. The problems with the conventional docking and undocking of windows utilizing the conventional method are the following.

Docking occurs only in the four border regions of the host window, not in the center of the host window. In a border region, multiple docking panes can be arranged in only one direction. Docking positions are limited to four positions. In the direction of the splitter bar, docking always occurs outside the split panes. Given a vertical splitter bar, for example, the left-top, left-bottom, right-top, and right-bottom positions are not available. The feedback during docking and undocking shows only the orientation and size of the resulting docked pane, but not how existing docking panes will be moved and resized. Therefore, the visual feedback to the user does not give the user an adequate indication of the total result of the docking.

Accordingly, what is needed is a system, method and article of manufacture for overcoming the above-identified problems. The present invention addresses such a need.

SUMMARY OF THE INVENTION

A system, method and article of manufacture for providing feedback concerning a content pane to be docked in a host window is disclosed. The system, method and article of manufacture comprises providing a description of a position of a content pane within a host window and utilizing a diagram to indicate the position and the orientation of the content pane within the host window. The system, method and article of manufacture also includes docking the content pane according to the description.

The system, method and article of manufacture in accordance with the present invention allows for docking to occur beyond the border regions. In addition, docking positions include the positions inside the split panes. Given a vertical splitter bar, for example, the left-top, left-bottom, right-top, and right-bottom positions are available. The thumbnail feedback when docking shows how existing docking panes will be moved and resized, as well as the orientation and relative size of the resulting docking pane.

DETAILED DESCRIPTION

The present invention relates generally to docking and undocking of windows in a computer and more particularly to providing feedback for docking a window. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
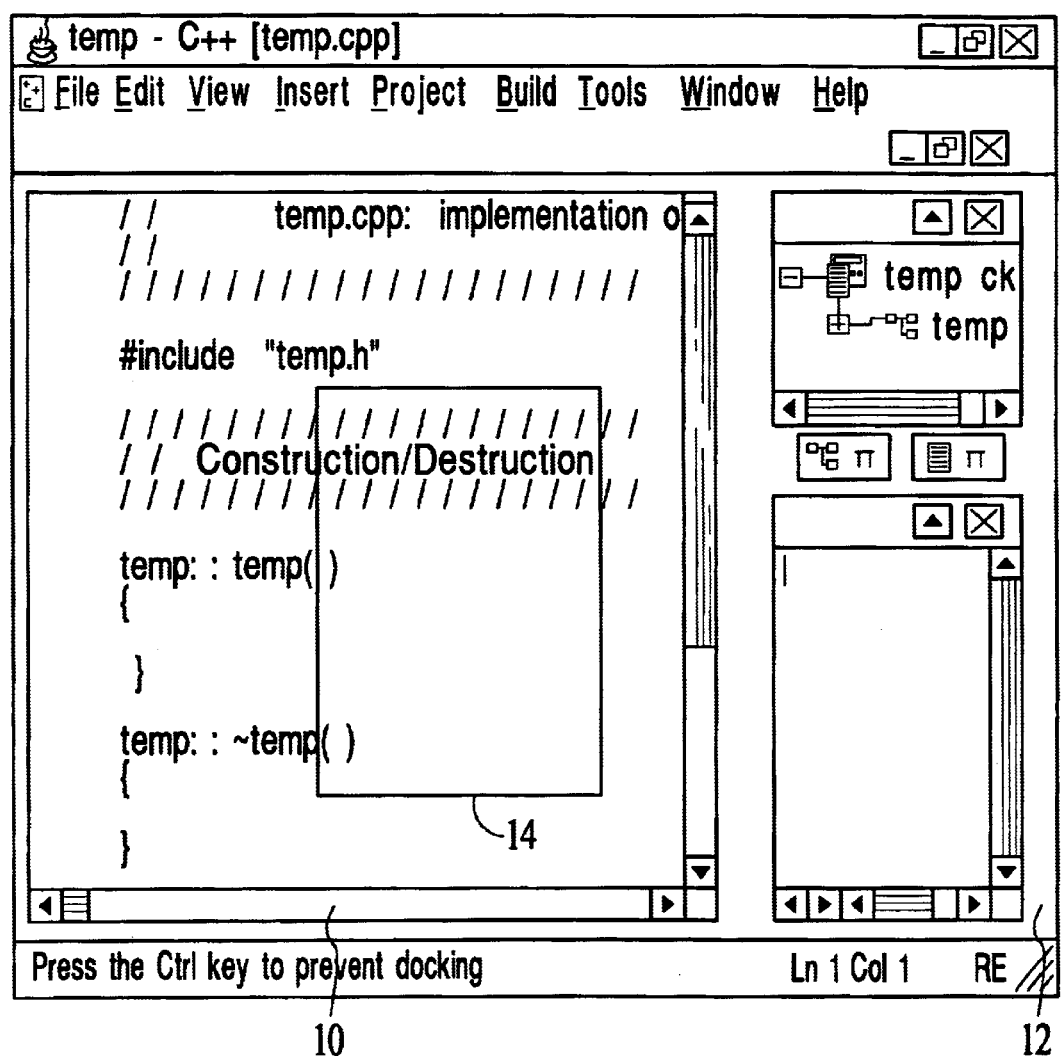
FIGS. 1 and 2 illustrate the conventional docking and undocking of a window.
Figure 2:
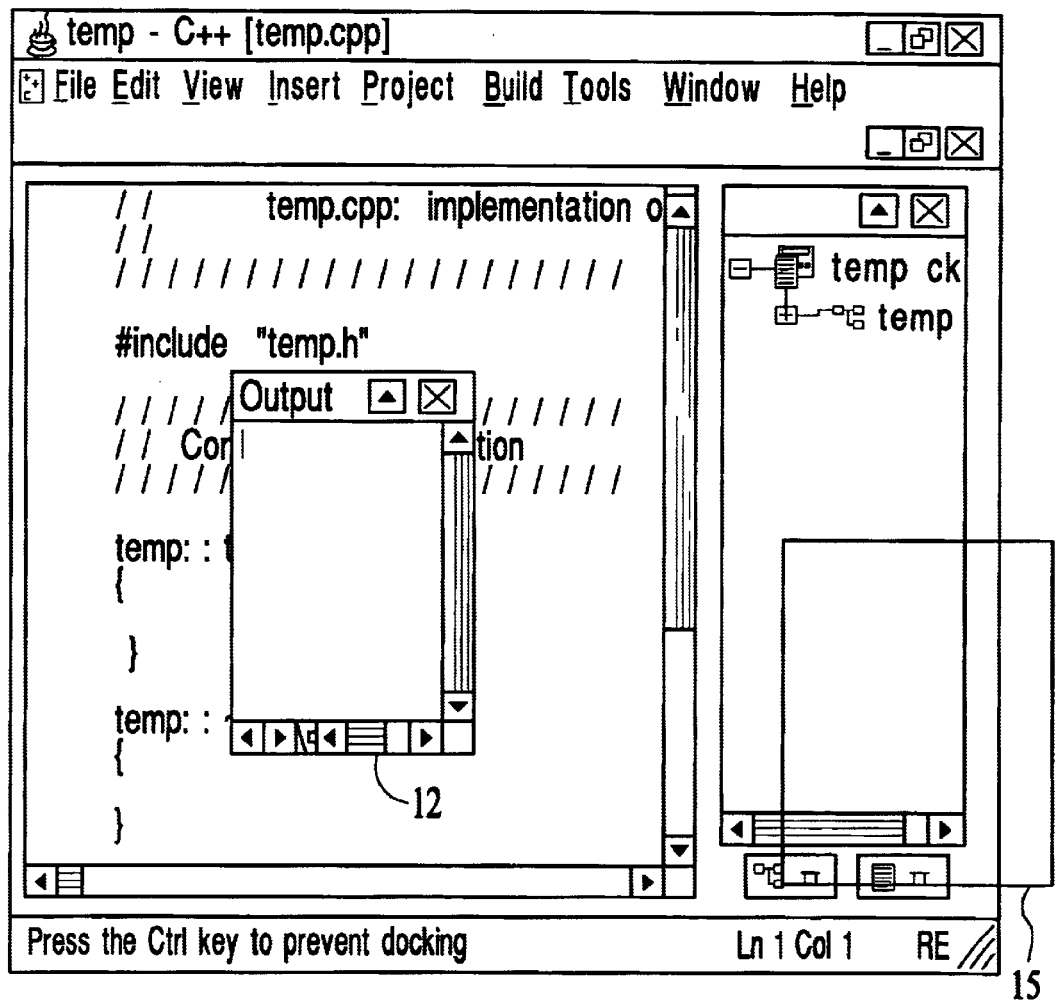
Figure 3:
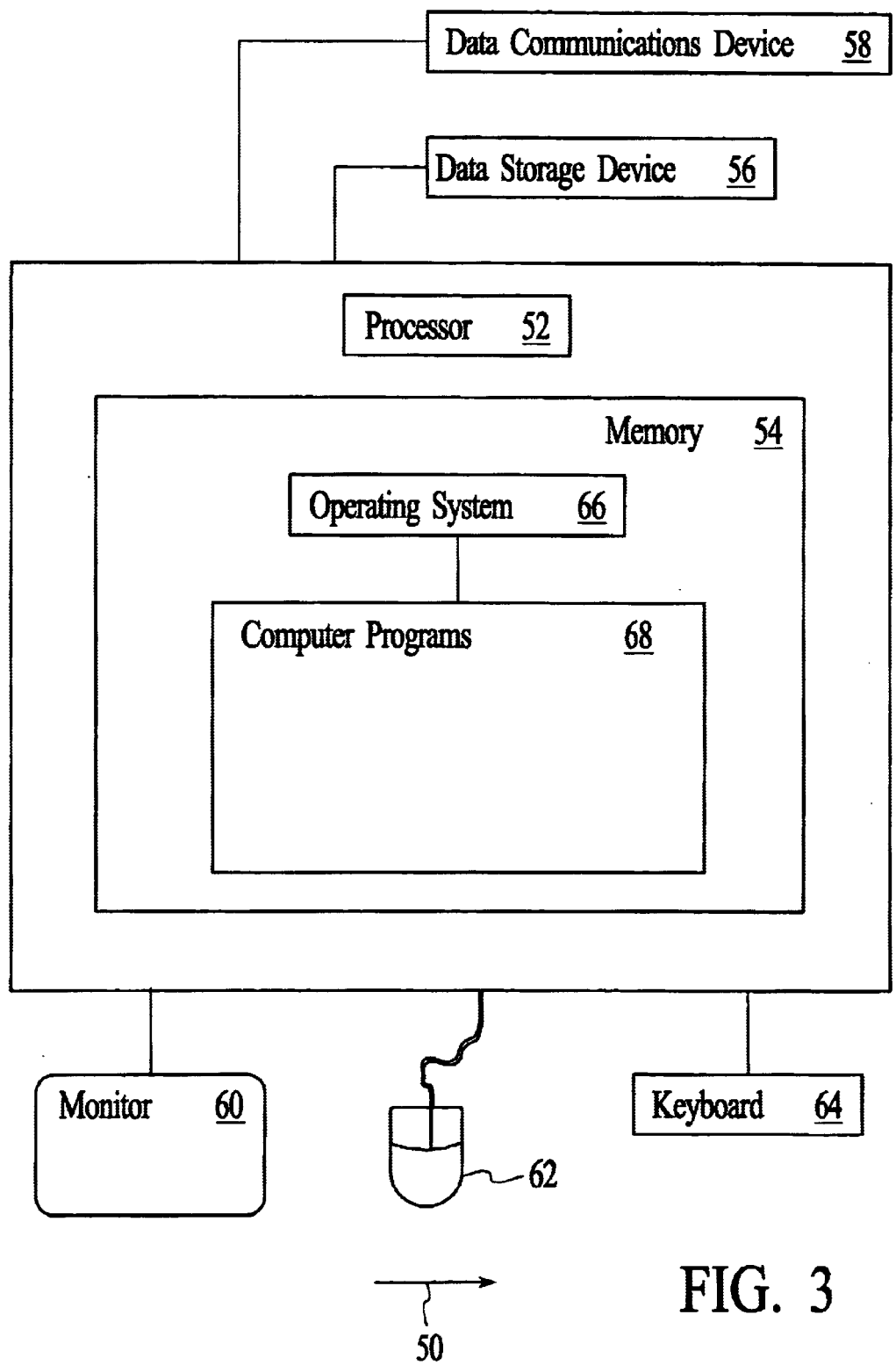
FIG. 3 illustrates a hardware environment used to implement a preferred embodiment of the present invention.

FIG. 3 illustrates a hardware environment used to implement a preferred embodiment of the present invention. As illustrated in FIG. 3, the preferred embodiment of the present invention is implemented in a computer 50. The computer 50 generally includes a processor 52, a memory 54 such as a random access memory (RAM), a data storage device 56 (e.g., hard drive, floppy disk drive, CD-ROM disk drive, etc.), a data communication device 58 (e.g., a modem, network interface device, etc.), a monitor 60 (e.g., CRT, LCD display, etc.), a pointing device 62 (e.g., a mouse, a track ball, a pad or any other device responsive to touch, etc.) and a keyboard 64. It is envisioned that attached to the computer 50 may be other devices such as read only memory (ROM), a video card drive, printers, peripheral devices including local and wide area network interface devices, etc. One of ordinary skill in the art will recognize that any combination of the above components may be used to configure the computer 50.

The computer 50 operates under the control of an operating system ("OS") 66, such as MVS™, AIX®, UNIX®, OS/2®, WINDOWS™, WINDOWS NT™, etc., which typically is loaded into the memory 104 during the computer 50 start up (boot-up) sequence after power-on or reset. (AIX and OS/2 are registered trademarks and MVS is a trademark of International Business Machines Corporation in the United States, other countries, or both. Windows and Windows NT are trademarks of Microsoft Corporation. UNIX is a registered trademark in the United States and/or other countries licensed exclusively through X/Open Company Limited.) In operation, the OS 66 controls the execution by the computer 50 of computer programs 68, including computer programs. Alternatively, a method, system and article of manufacture in accordance with the present invention may be implemented with any one or all of the computer programs 68 embedded in the OS 66 itself without departing from the scope of the invention. Preferably, however, the client programs are separate from the computer programs.

The OS 66 and the computer programs 68 each comprise computer readable instructions which, in general, are tangibly embodied in or are readable from a media such as the memory 54, the data storage device 56 and/or the data communications device 58. When executed by the computer 50, the instructions cause the computer 50 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

In accordance with the present invention, various embodiments for a window docking are presented that allow for feedback of the configurations displayed on a graphical user interface of the computer 50. Such a graphical user interface in a computer system may be implemented via conventional programming techniques.

Figure 4A:
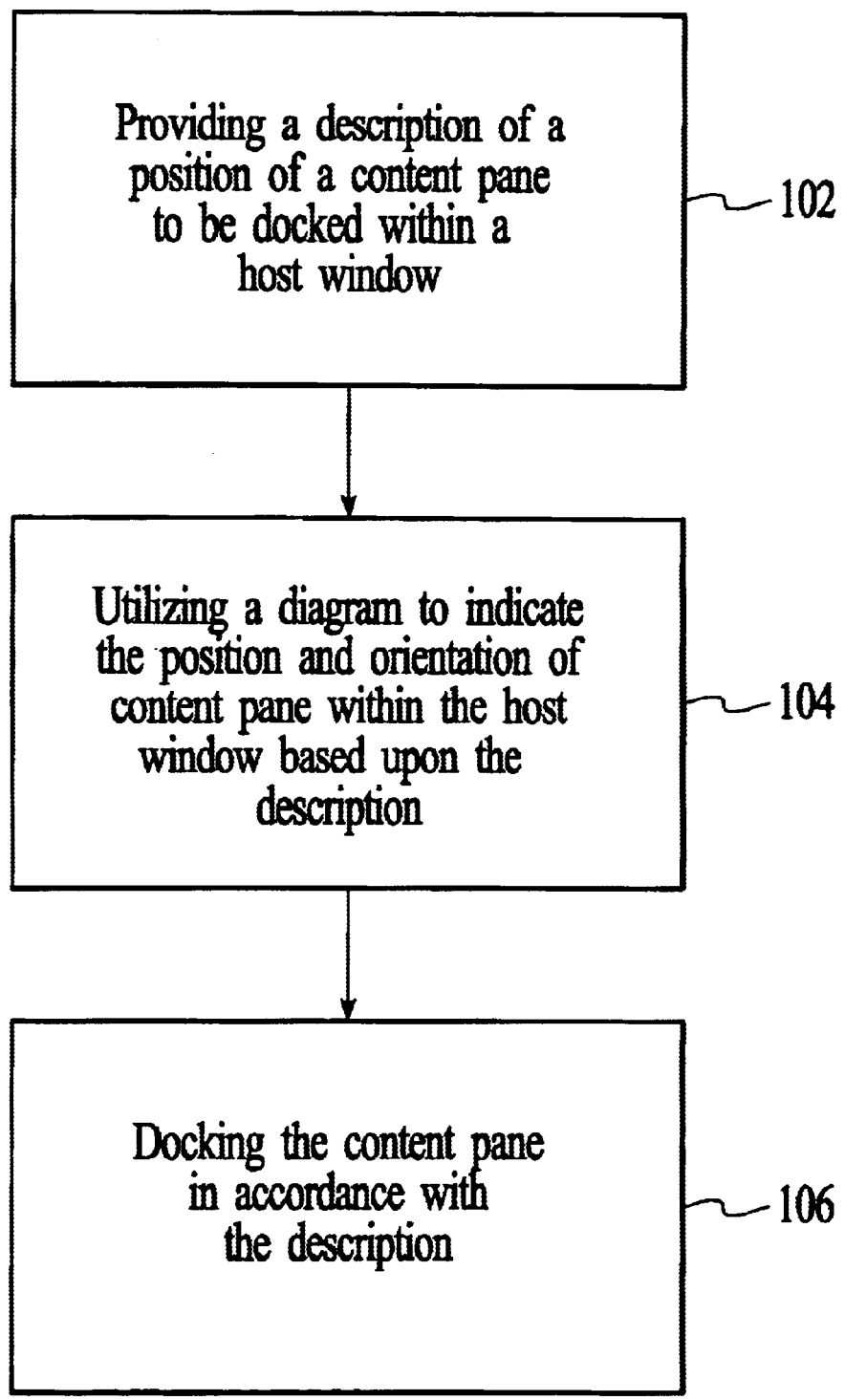
FIG. 4A is a simple flow chart for providing docking feedback in accordance with a preferred embodiment of the present invention.

FIG. 4A is a simple flow chart for providing docking feedback in accordance with the present invention. In this embodiment, first a description of a position of a preferred embodiment of a content pane to be docked within a host window is determined, via step 102. Next, a diagram is utilized to indicate the position and the orientation of the content pane within the host window based upon the description, via step 104. Finally, the content pane is docked in accordance with the description, via step 106.

To describe the present invention in the context of a preferred embodiment, refer now to the following description in conjunction with the accompanying Figures.

Figure 4B:
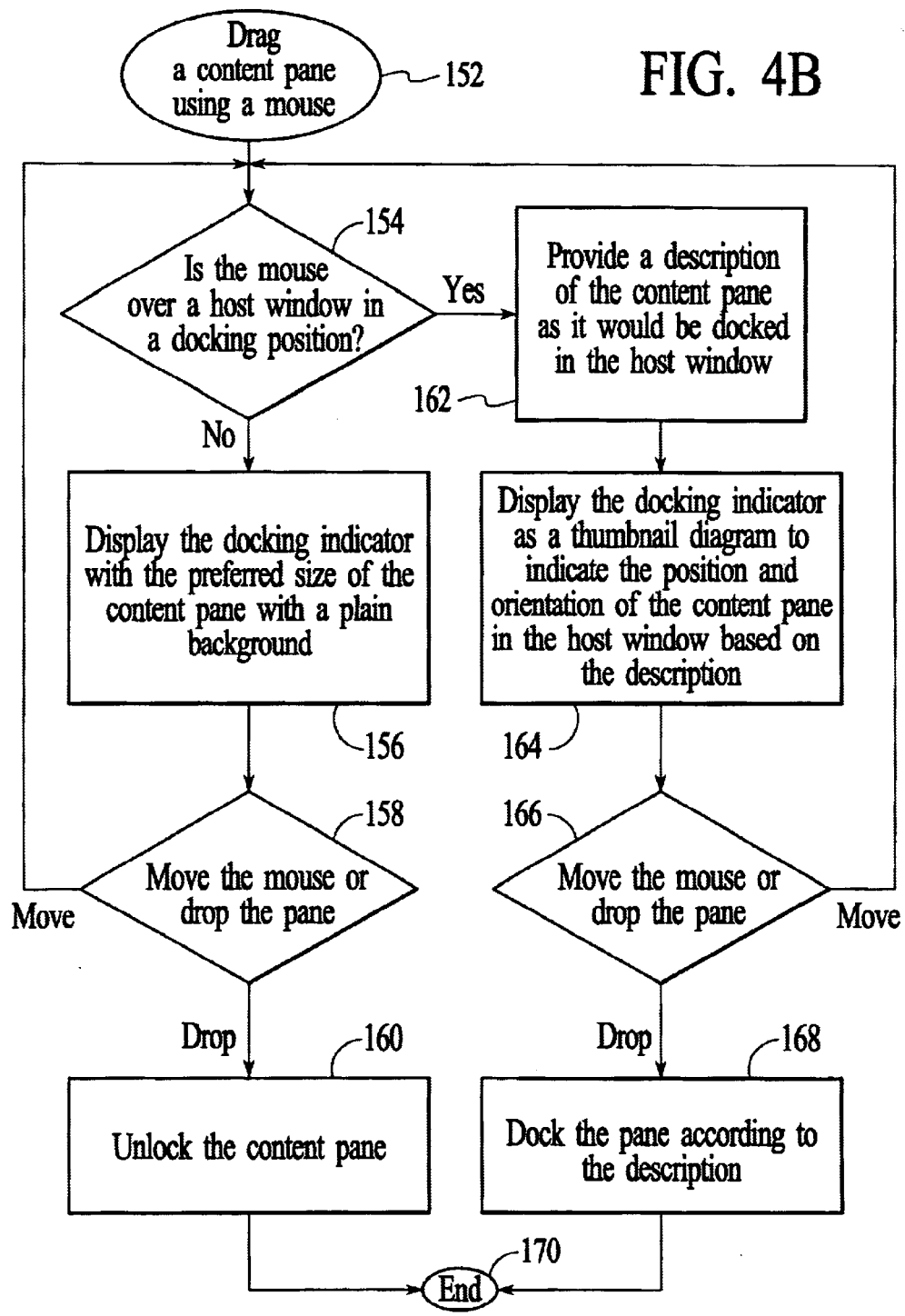
FIG. 4B is a detailed flow chart for providing docking feedback in accordance with a preferred embodiment of the present invention.

FIG. 4B is a detailed flow chart for providing docking feedback in accordance with a preferred embodiment of the present invention. In this preferred embodiment, a mouse is used to control a content pane that is to be docked. One of ordinary skill in the art readily recognizes, however, that any type of pointing device could be used and that use would be within the spirit and scope of the present invention. First, a content pane is dragged using the mouse, via step 152. Next, it is determined if the mouse is over a host window in a docking position, via step 154. If it is not, then the docking indicator is displayed with the preferred size of the content pane with a plain background, via step 156. Next, it is determined if the mouse is to be moved or the pane is to be dropped, via step 158. If the mouse is to be moved, then return to step 154. If the mouse is to be dropped, then unlock the content pane, via step 160, and the process ends.

On the other hand, if the mouse is over a host window in a docking position, a description of the content pane is provided, as it would be docked in the host window, via step 162. Thereafter, the docking indicator is displayed as a thumbnail diagram to indicate the position and orientation of the content pane in the host window based on the description, via step 164. Next, it is determined if the mouse is to be moved or the pane is to be dropped, via step 166. If the mouse is moved, then return to step 154. If on the other hand, if the pane is dropped, then the pane is docked according to the description, via step 168, and the process ends 170. Accordingly, through this system, docking feedback provides the size, orientation and/or position of the content pane in a thumbnail diagram.

A preferred embodiment in accordance with the present invention utilizes a syntax describing the position of a window to be docked which allows the user to specify a docking position. In the preferred embodiment, the syntax for the docking position is a string which includes a sequence of letters, numbers, brackets, and semicolons. The definition of each element in such an embodiment is described below:

[ begins the description of a split pane

] ends the description of a split pane

; divides the two sides of a split pane

H The two panes are split along the y axis (into left and right panes)

V The two panes are split along the x axis (into top and bottom panes)

C The dragged content pane should be centered in the client area

E The dragged content pane should be east of a horizontal split pane

W The dragged content pane should be west of a horizontal split pane

N The dragged content pane should be north of a vertical split pane

S The dragged content pane should be south of a vertical split pane

T The dragged content pane should be at the top of the split pane

B The dragged content pane should be at the bottom of the split pane

L The dragged content pane should be at the left of the split pane

R The dragged content pane should be at the right of the split pane number The proportion of the top or left pane in a split pane.

Two examples which utilize this syntax are shown below:

EXAMPLE 1

"[H 0.3;[V 0.5;]]" describes a horizontal split where the left pane has 30% of the width, and the right pane is split vertically where the top pane has 50%; the content pane is not eligible to be docked.

EXAMPLE 2

"[H 0.3[V 0.5;];S]" describes a horizontal split where the left pane has 30% of the width and is split vertically where the top pane has 50%; the content pane is eligible to be docked on the south part of the right pane.

For the purposes of specifying the docking location only, the proportion numbers may be left out. However, a full description of a potential docking position is generated, including the proportion numbers, for the routine that provides the thumbnail.

Figure 5:
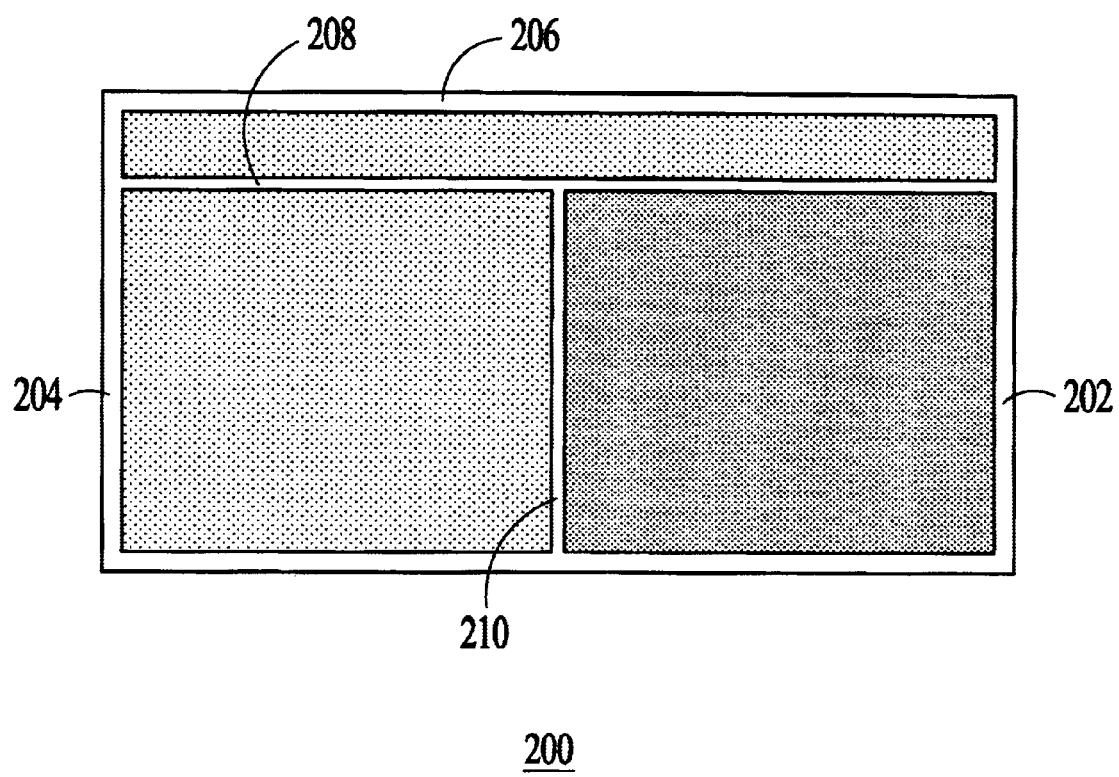
FIG. 5 is a diagram of a thumbnail utilized to indicate the docking position of a content pane in accordance with a preferred embodiment of the present invention.

FIG. 5 is a diagram of a thumbnail 200 utilized to indicate the docking position of a content pane in accordance with the present invention. The thumbnail 200 includes three content panes 202–206 and two splitter bars 208 and 210. In this embodiment, the content pane 202 is to be docked. The number of content panes and splitter bars is arbitrary, and one of ordinary skill in the art would recognize that any number of content panes and splitter bars could be utilized within the scope and nature of the present invention.

When a content pane 202 is dockable as indicated by the dark area, the thumbnail diagram 200 is displayed to show the resulting docking configuration under a dragging pointing device. The dark area can be any color, the key element being that the content pane to be docked is readily identified. When the content pane 202 is undockable, an outline of the content pane is shown (with the size and orientation of the resulting undocked window).

Figure 6:
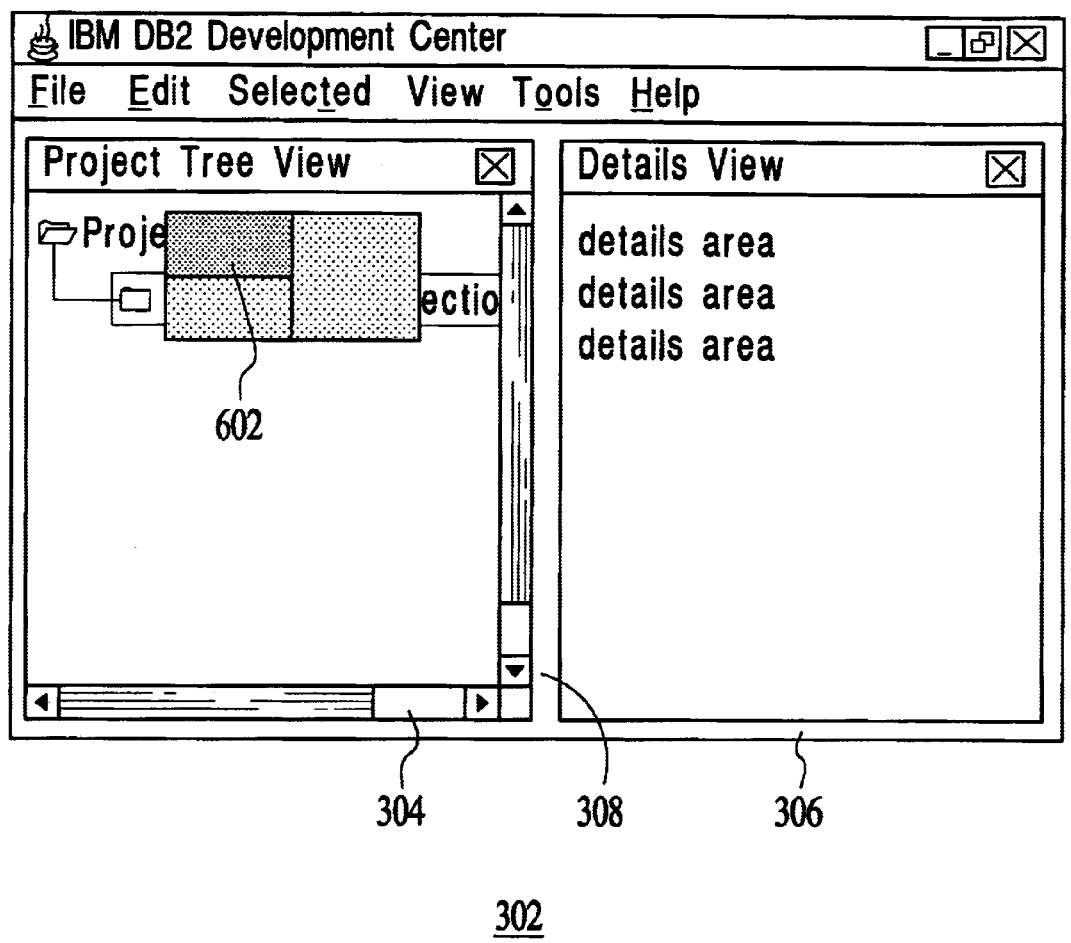
FIG. 6 shows a left-top docking position of the content pane of the thumbnail.
Figure 7:
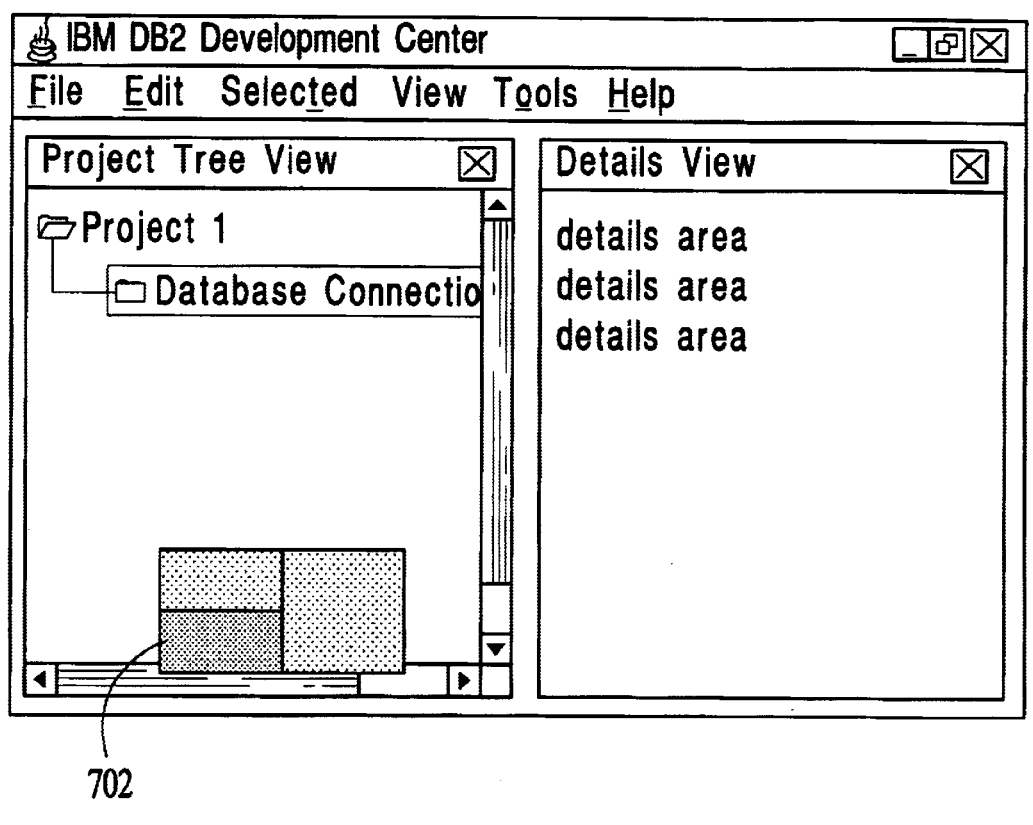
FIG. 7 shows a left-bottom docking position of the content pane of the thumbnail.
Figure 8:
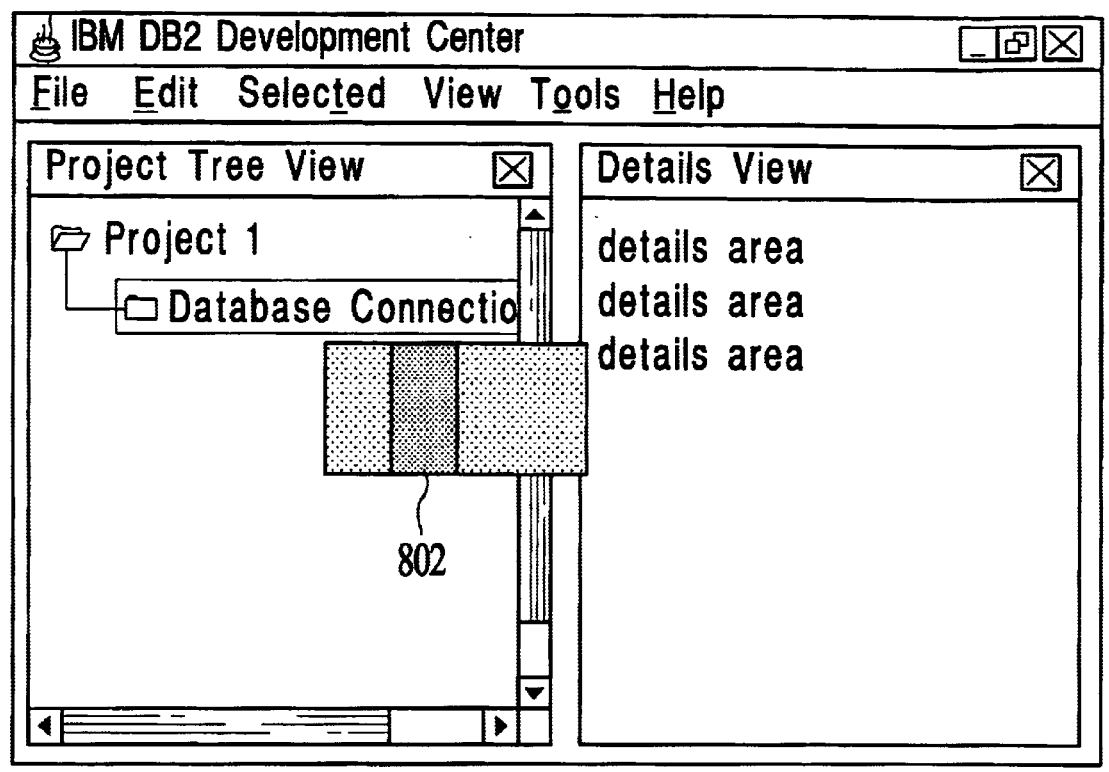
FIG. 8 shows a left-right docking position of the content pane of the thumbnail.
Figure 9:
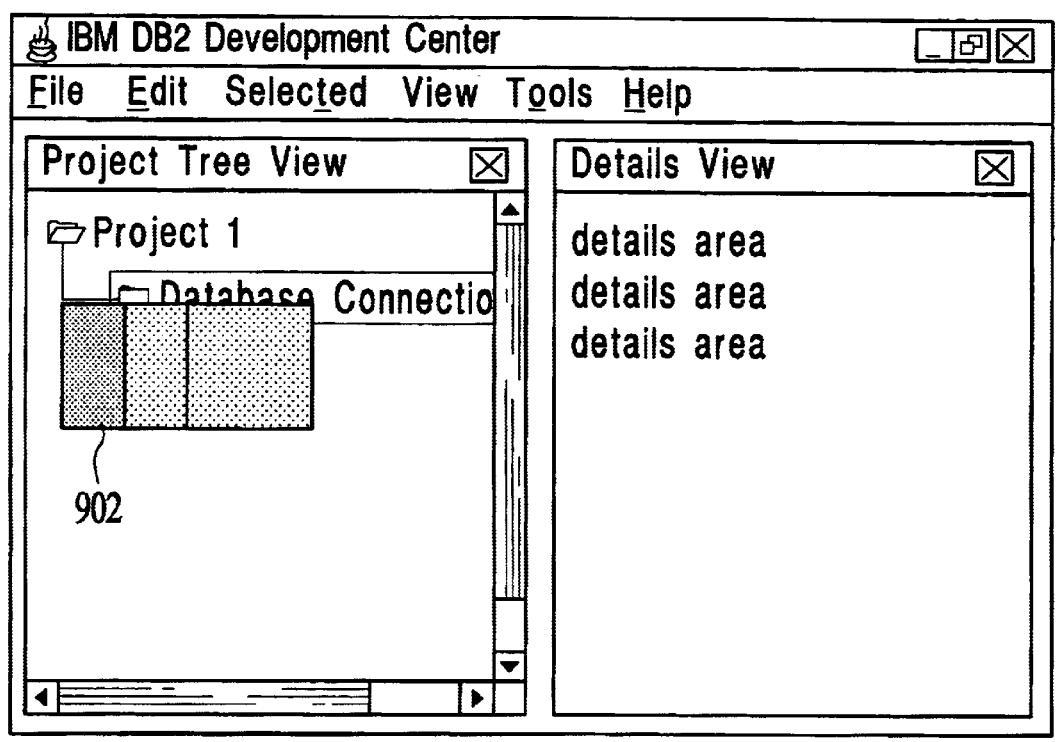
FIG. 9 shows a left-left docking position of the content pane of the thumbnail.
Figure 10:
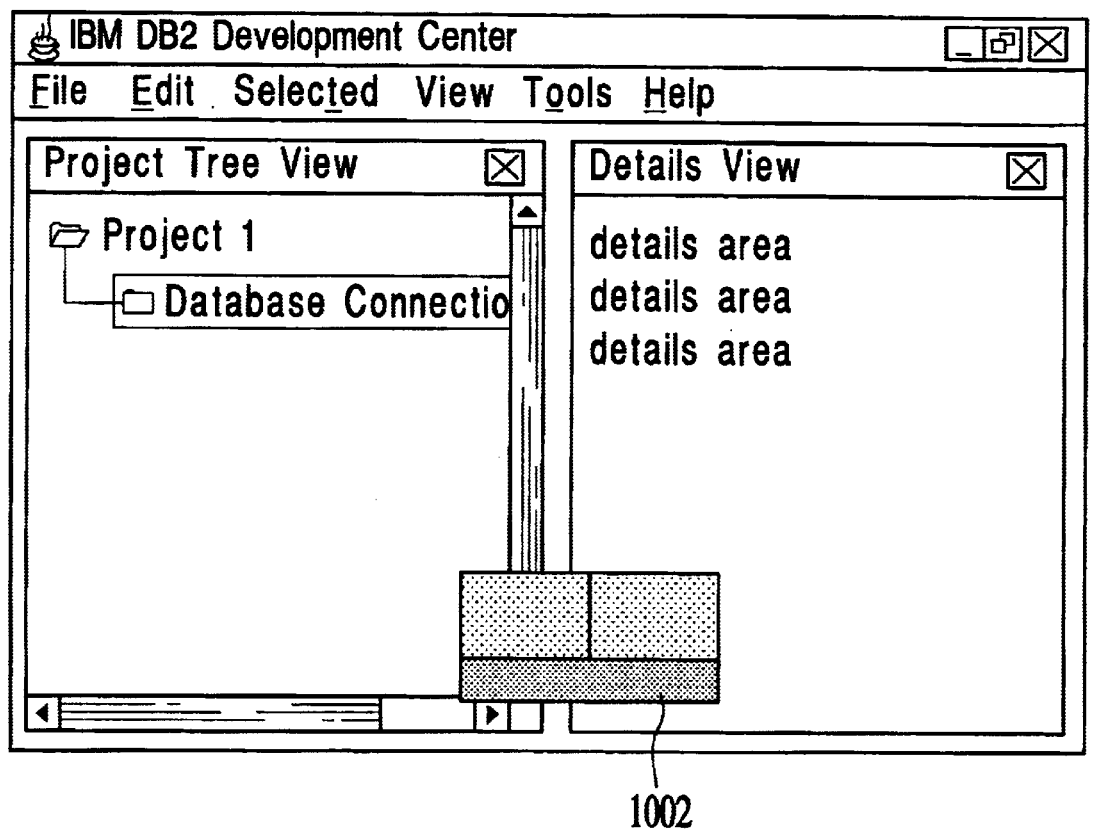
FIG. 10 shows a splitter-bottom docking position of the content pane of the thumbnail.
Figure 11:
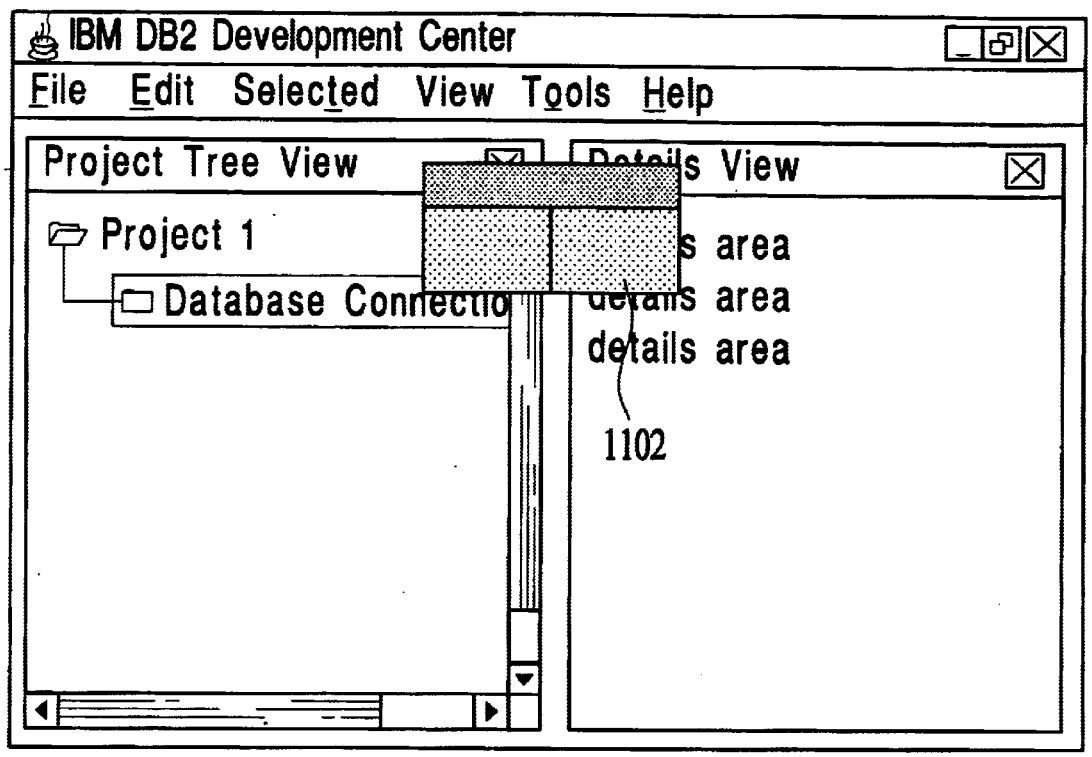
FIG. 11 shows a splitter-top docking position of the content pane of the thumbnail.

Each existing content pane defines four docking positions (top, left, bottom, and right); each splitter bar defines two docking positions (one at each end). For example, when the host window 302 of FIG. 6 contains two docking panes 304 and 306 with a vertical splitter bar 308, the thumbnail for docking a third window can be oriented into ten docking positions. Six of these positions within a host window 302 are illustrated by FIGS. 6–10. FIG. 6 shows a left-top docking position of the content pane represented by the thumbnail 602. FIG. 7 shows a left-bottom docking position of the content pane represented by the thumbnail 702. FIG. 8 shows a left-right docking position of the content pane represented by the thumbnail 802. FIG. 9 shows a left-left docking position of the content pane represented by the thumbnail 902. FIG. 10 shows a splitter-bottom docking position of the content pane represented by the thumbnail 1002. FIG. 11 shows a splitter-top docking position of the content pane represented by the thumbnail 1102. Similarly, the other five positions, right-top, right-left, right-bottom and right-right docking positions could also be provided through the use of the appropriate thumbnail.

Figure 12:
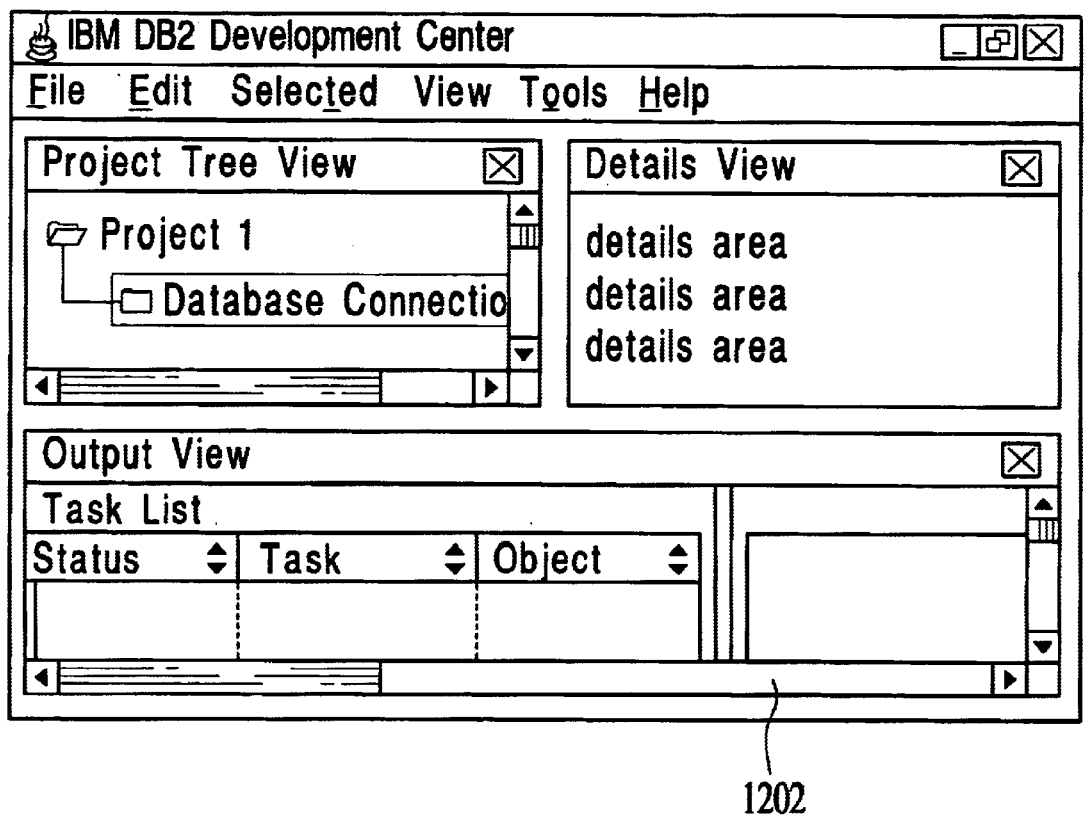
FIG. 12 shows the result of splitter-bottom docking of the content pane in the host window.

FIG. 12 shows the result of a splitter-bottom docking of the content pane 202 in the host window 302. That is, the content pane 1202 is at a horizontal bottom position. Accordingly, through the present invention an indication of the size, orientation and/or position of the dockable content is illustrated via a thumbnail.

The preferred embodiment in accordance with the present invention has the following advantages over conventional docking and undocking schemes. Docking can occur anywhere in the host window, not only in the border regions. Docking positions include the positions inside the split panes. For example, given a vertical splitter bar, for example, the left-top, left-bottom, right-top, and right-bottom positions are available. The thumbnail feedback when docking shows how existing docking panes will be moved and resized, as well as the orientation and relative size of the resulting docking pane.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing feedback concerning a content pane to be docked in a host window, the method comprising the steps of:
   (a) determining if the content pane to be docked is positioned over the host window in a docking position;
   (b) if the content pane to be docked is over the host window in a docking position, then providing a description of a position at which the content pane is to be docked within the host window; and
   (c) utilizing said description to display a docking indicator that indicates the position and orientation of how the content pane is to be docked within the host window.

2. The method of claim 1 further comprising the step of (d) docking the content pane in accordance with the description.

3. The method of claim 2 wherein the docking indicator is a thumbnail diagram which illustrates the content pane along with at least one other content pane and at least one splitter bar within the host window.

4. The method of claim 3 in which the content pane within the thumbnail diagram that is to be docked is identified by a particular color.

5. The method of claim 4 in which the thumbnail diagram is displayed in response to dragging the content pane into a docking position over the host window.

6. A system for providing feedback concerning a content pane to be docked in a host window, the system comprising:
   (a) means for determining if the content pane to be docked is positioned over the host window in a docking position;
   (b) means for providing a description of a position at which the content pane is to be docked within the host window when the content pane to be docked is over the host window in a docking position; and
   (c) means for utilizing said description to display a docking indicator that indicates the position and orientation of how the content pane is to be docked within the host window.

7. The system of claim 6 further comprising means (d) for docking the content pane in accordance with the description.

8. The system of claim 7 wherein the docking indicator is a thumbnail diagram that illustrates the content pane along with at least one other content pane and at least one splitter bar within the host window.

9. The system of claim 8 wherein the docking indicator is a thumbnail diagram which illustrates the content pane along with at least one other content pane and at least one splitter bar within the host window.

10. The method of claim 9 in which the thumbnail diagram is displayed in response to dragging the content pane into a docking position over the host window.

11. A computer readable medium containing program instructions for providing feedback concerning a content pane to be docked in a host window, the program instructions comprising the steps for:
   (a) determining if the content pane to be docked is positioned over the host window in a docking position;
   (b) if the content pane to be docked is over the host window in a docking position, then providing a description of a position at which the content pane is to be docked within the host window; and (c) utilizing said description to display a docking indicator that indicates the position and orientation of how the content pane is to be docked within the host window.

12. The computer readable medium of claim 11 which further includes program instructions for (d) docking the content pane in accordance with the description.

13. The computer readable medium of claim 12 wherein the docking indicator is a thumbnail diagram which illustrates the content pane along with at least one other content pane and at least one splitter bar within the host window.

14. The computer readable medium of claim 13 in which the content pane within the thumbnail diagram that is to be docked is identified by a particular color.

15. The computer readable medium of claim 14 in which the thumbnail diagram is displayed in response to dragging the content pane into a docking position over the host window.

* * * * *